(12) United States Patent
Asonuma et al.

(10) Patent No.: US 12,179,165 B2
(45) Date of Patent: Dec. 31, 2024

(54) REFORMING FURNACE

(71) Applicant: Osaka Gas Co., Ltd., Osaka (JP)

(72) Inventors: Hidaka Asonuma, Osaka (JP); Koichiro Ikeda, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 656 days.

(21) Appl. No.: 17/440,405

(22) PCT Filed: Mar. 26, 2020

(86) PCT No.: PCT/JP2020/013549
§ 371 (c)(1),
(2) Date: Sep. 17, 2021

(87) PCT Pub. No.: WO2020/196711
PCT Pub. Date: Oct. 1, 2020

(65) Prior Publication Data
US 2022/0152576 A1 May 19, 2022

(30) Foreign Application Priority Data
Mar. 26, 2019 (JP) .................................. 2019-058844

(51) Int. Cl.
B01J 19/24 (2006.01)
C01B 3/38 (2006.01)
(Continued)

(52) U.S. Cl.
CPC ........... *B01J 19/2415* (2013.01); *C01B 3/388* (2013.01); *F22B 21/26* (2013.01); *F23L 15/00* (2013.01);
(Continued)

(58) Field of Classification Search
CPC ..... B01J 8/00; B01J 8/02; B01J 8/0242; B01J 8/0257; B01J 8/0285; B01J 8/06;
(Continued)

(56) References Cited

U.S. PATENT DOCUMENTS 5,639,431 A 6/1997 Shirasaki et al.
6,296,679 B1 10/2001 Kato
(Continued)

FOREIGN PATENT DOCUMENTS

CN 101842316 A 9/2010
DE 3912003 A1 10/1989
(Continued)

OTHER PUBLICATIONS

KR 101480083 B1 with machine translation (Year: 2014).*

*Primary Examiner* — Natasha E Young
(74) *Attorney, Agent, or Firm* — The Webb Law Firm

(57) ABSTRACT

At a center portion of a ceiling wall of a furnace body having a lateral wall between the ceiling wall and a bottom wall, there is a burner that combusts downwards. A reforming reaction tube is provided in a circumference of the burner to carry out a steam reforming treatment on a source gas. A discharging portion is an opening at an upper side portion of the lateral wall for discharging combustion gas of the burner. A cylindrical outer wall is disposed at an outer side portion of the lateral wall. In an outside space formed between the lateral wall and the outer wall, there is a steam generating heat exchanger generating steam or a mixture gas of a source gas and steam. At a lower side portion of the outer wall, there is outside discharging opening discharging the combustion gas which flows through the outside space.

6 Claims, 2 Drawing Sheets

(51) Int. Cl.
*F22B 21/26* (2006.01)
*F23L 15/00* (2006.01)

(52) U.S. Cl.
CPC .............. *B01J 2219/00087* (2013.01); *B01J 2219/00157* (2013.01); *C01B 2203/0233* (2013.01); *C01B 2203/0811* (2013.01)

(58) Field of Classification Search
CPC ... B01J 8/062; B01J 19/00; B01J 19/04; B01J 19/2415; B01J 2208/00; B01J 2208/00008; B01J 2208/00017; B01J 2208/00106; B01J 2208/00168; B01J 2208/00203; B01J 2208/00504; B01J 2208/0053; B01J 2219/00; B01J 2219/00049; B01J 2219/00051; B01J 2219/00074; B01J 2219/00087; B01J 2219/00157; C01B 3/00; C01B 3/32; C01B 3/34; C01B 3/38; C01B 3/384; C01B 3/388; C01B 3/48; C01B 2203/00; C01B 2203/02; C01B 2203/0205; C01B 2203/0227; C01B 2203/0233; C01B 2203/04; C01B 2203/042; C01B 2203/043; C01B 2203/08; C01B 2203/0805; C01B 2203/0811; C01B 2203/12; C01B 2203/1288; F22B 21/00; F22B 21/22; F22B 21/26; F23L 15/00; Y02E 20/00; Y02E 20/34; Y02P 20/00; Y02P 20/10; Y02P 20/129

See application file for complete search history.

(56) References Cited

U.S. PATENT DOCUMENTS

| | | | |
|---|---|---|---|
| 2004/0043262 | A1 | 3/2004 | Asou et al. |
| 2010/0254865 | A1 | 10/2010 | Choi et al. |

FOREIGN PATENT DOCUMENTS

| | | | |
|---|---|---|---|
| DE | 69736438 | T2 | 8/2007 |
| JP | 5301701 | A | 11/1993 |
| JP | 6263402 | A | 9/1994 |
| JP | 6263403 | A | 9/1994 |
| JP | 6263404 | A | 9/1994 |
| JP | 2003252604 | A | 9/2003 |
| JP | 4603251 | B2 | 10/2010 |
| JP | 2011121790 | A | 6/2011 |
| JP | 2013133265 | A | 7/2013 |
| JP | 2014185045 | A | 10/2014 |
| JP | 2015140285 | A | 8/2015 |

\* cited by examiner

REFORMING FURNACE

CROSS-REFERENCE TO RELATED APPLICATIONS

This application is the United States national phase of International Application No. PCT/JP2020/013549, now WO 2020/196711, filed Mar. 26, 2020, and claims priority to Japanese Patent Application No. 2019-058844 filed Mar. 26, 2019, the disclosures of which are hereby incorporated by reference in their entirety.

BACKGROUND OF THE INVENTION

1. Field of the Invention

The present invention relates to a reforming furnace including:
a burner combusting downwards and provided at a center portion of a ceiling wall of a furnace body having a cylindrical lateral wall disposed between the ceiling wall and a bottom wall;
a reforming reaction tube provided in a circumference of the burner in suspension from the ceiling wall and configured to carry out a steam reforming treatment on a hydrocarbon-based gas as a source gas; and
a discharging portion provided as an opening at an upper portion of the lateral wall for discharging combustion gas of the burner.

2. Description of Related Art

Such reforming furnace is used for carrying out a reforming reaction treatment in which source gas comprised of hydrocarbon-based gas such as natural gas, naphtha or the like with steam mixed therein is supplied to the reforming reaction tube to be reformed to a reformed gas having an enhanced hydrogen content through a steam reforming treatment.

As a conventional example of such reforming furnace, there is known one configured with the lateral wall of the furnace body being exposed to the outside (see Patent Document 1 for instance).

Incidentally, though not described in Patent Document 1, according to the conventional practice, there is provided a heat exchanger for steam generation which is heated by combustion gas discharged from the discharging portion of the furnace body and pure water is supplied to this steam generating heat exchanger for steam production or with supply of the source gas and pure water to the steam generating heat exchanger to generate mixture gas of steam and the source gas, whereby exhaust heat of the combustion gas is recovered.

Patent Document 1: Japanese Unexamined Patent Application Hei. 5-301701 document.

SUMMARY OF THE INVENTION

With the conventional reforming furnace, a steam generating heat exchanger is provided and with supplying of steam or mixture gas which has recovered heat of the combustion gas discharged from the discharging portion of the furnace body, it is made possible to reduce the amount of combustion of the burner requisite for maintaining a catalyst inside the reforming reaction tube at an appropriate temperature (e.g. 650° C.).

However, with the conventional reforming furnace, the heat inside the furnace body can be discharged easily through the lateral wall which is exposed to the outside. Due to this, there was an inconvenience that desirable reduction in the amount of combustion of the burner required for maintaining a catalyst inside the reforming reaction tube at an appropriate reaction temperature (e.g. 650° C.) cannot be achieved sufficiently.

Further, in the convention, the steam generating heat exchanger is provided separately of the furnace body, so it was difficult to dispose the steam generating heat exchanger and the furnace body in a compact manner.

The present invention has been made in view of the above-described state of the art and its object is to provide a reforming furnace that allows sufficient reduction in the combustion amount of the burner while maintaining the catalyst inside the reforming reaction tube at an appropriate reaction temperature and that allows also compact layouts of the steam generating heat exchanger and the furnace body.

A reforming furnace according to the present invention comprises:
a burner combusting downwards and provided at a center portion of a ceiling wall of a furnace body having a cylindrical lateral wall disposed between the ceiling wall and a bottom wall;
a reforming reaction tube provided in a circumference of the burner in suspension from the ceiling wall and configured to carry out a steam reforming treatment on a hydrocarbon-based gas as a source gas; and
a discharging portion provided as an opening at an upper side portion of the lateral wall for discharging combustion gas of the burner;
wherein a cylindrical outer wall is disposed at an outer side portion of the lateral wall between the ceiling wall and the bottom wall;
in an outside space formed between the lateral wall and the outer wall, there is disposed a steam generating heat exchanger generating steam or a mixture gas of a source gas and steam to be supplied to an upper portion of the reforming reaction tube; and
at a lower side portion of the outer wall, there is provided an outside discharging opening discharging the combustion gas which flows from the discharging portion through the outside space.

Namely, at an outside portion of the lateral wall of the furnace body, a cylindrical outer wall is disposed between the ceiling wall and the bottom wall, and combustion gas discharged from the discharging portion flows through the outside space formed between the lateral wall and the outer wall to be discharged to the outside via the outside discharging opening provided at the lower side portion of the outer wall. Thus, as the outer side portion of the lateral wall of the furnace body is covered by the outer wall and also the combustion gas flows through the outside space formed between the lateral wall and the outer wall, it becomes possible to improve the heat insulating performance for suppressing escape of the heat generated by combustion of the burner to the outside of the furnace body. Consequently, it is possible to achieve sufficient reduction of the combustion amount of the burner while maintaining the catalyst inside the reforming reaction tube at an appropriate reaction temperature.

Moreover, since the steam generating heat exchanger is disposed in the outside space formed between the lateral wall and the outer wall through which the combustion gas flows, as compared with an arrangement of the steam generating heat exchanger being disposed at a different portion from the furnace body, the steam generating heat exchanger and the furnace body can be disposed in a compact manner.

In short, according to the characterizing feature of the reforming furnace of the present invention, it is possible to achieve sufficient reduction of the combustion amount of the burner while maintaining the catalyst inside the reforming reaction tube at an appropriate reaction temperature and also to dispose the steam generating heat exchanger and the furnace body in a compact manner.

According to a further characterizing feature of the present invention, the steam generating heat exchanger is configured with a heat conducting pipe being disposed in a spiral form along an outer circumference of the lateral wall.

Namely, as the pure water or the source gas and the pure water is caused to flow through a heat conducting pipe disposed in a spiral form along an outer circumference of the lateral wall of the furnace body, steam or the mixture gas of the source gas and steam is generated.

And, since such heat conducting pipe disposed in a spiral form along an outer circumference of the lateral wall of the furnace body makes it possible to sufficiently increase the length of the passage for flowing of the pure water or the source gas and the pure water, sufficient heating is possible with flowing of pure water or the source gas and the pure water. As a result, steam or the mixture gas of the source gas and steam can be generated in an appropriate manner.

In short, according to the characterizing feature of the reforming furnace of the present invention, steam or the mixture gas of the source gas and steam can be generated in an appropriate manner.

According to a further characterizing feature of the reforming furnace of the present invention; the reforming reaction tube includes:
 an outer tube having a closed bottom portion and a supported upper end side;
 an inner tube disposed inside the outer tube, the inner tube having an opened bottom portion and a supported upper end side; and
 a plurality of reaction tube portions charged with a catalyst and disposed between the outer tube and the inner tube, the reaction tube portions being disposed side by side with spacing therebetween along a circumference of the burner.

Namely, the reforming reaction tube is configured with a plurality of reaction tube portions thereof being disposed side by side with spacing therebetween along a circumference of the burner. Thus, when the combustion gas of the burner flows through the spacings between the adjacent reaction tube portions or between the bottom portions of the reaction tube portions and the bottom wall of the furnace body, the plurality of reaction tube portions can be heated in a favorable manner by this combustion gas.

Moreover, since each one of the plurality of reaction tube portions includes an outer tube having a closed bottom portion and a supported upper end side, an inner tube disposed inside the outer tube, the inner tube having an opened bottom portion and a supported upper end side and a catalyst charged between the outer tube and the inner tube, it becomes possible to carry out a steam reforming treatment with causing the source gas and steam to flow through the spacing between the outer tube and the inner tube and then through the inside of the inner tube.

And, since catalyst is charged between the outer tube and the inner tube, the catalyst can be heated in a favorable manner with the combustion gas which flows on the outer circumferential side of the outer tube while flowing through the spacings between the adjacent reaction tube portions or between the bottom portions of the reaction tube portions and the bottom wall of the furnace body.

In short, according to the further characterizing feature of the reforming furnace of the present invention, the catalyst of the reforming reaction tube can be heated in a favorable manner by the combustion gas of the burner.

According to a still further characterizing feature of the reforming furnace of the present invention, between the steam generating heat exchanger and the outer wall in the outside space, there is provided an air preheating heat exchanger for preliminarily heating air to be supplied to the burner.

Namely, since an air preheating heat exchanger for preheating air to be supplied to the burner is provided between the steam generating heat exchanger and the outer wall in the outside space which is formed between the outer wall and the lateral wall, by heating the air preheating heat exchanger by the combustion gas of the burner, heat of the combustion gas can be recovered inside the furnace body.

Namely, by heating the air preheating heat exchanger by the combustion gas of the burner, the heat of the combustion gas can be recovered inside the furnace body with using air for combustion. Therefore, with increase in the heat recovery amount of the combustion gas, further reduction in the combustion amount of the burner is made possible.

In short, according to the still further characterizing feature of the present invention, further reduction in the combustion amount of the burner is made possible.

According to a still further characterizing feature of the present invention:
 the air preheating heat exchanger has a cylindrical configuration in which air is caused to flow between a cylindrical inside wall and a cylindrical outside wall;
 an air introducing portion is provided at a lower side portion of the air preheating heat exchanger; and
 a plurality of air supplying pipes connecting an upper side portion of the air preheating heat exchanger and the burner are disposed in a radial layout along the circumference of the burner and provided inside the ceiling wall.

Namely, since the air preheating heat exchanger has a cylindrical configuration in which air is caused to flow between a cylindrical inside wall and a cylindrical outside wall, this air preheating heat exchanger acts as a heat insulator covering the inner face of the outer wall, so that further heat insulating performance for suppressing escape of heat generated by combustion of the burner to the outside of the furnace body can be achieved.

Moreover, air introduced through the air introducing portion provided at a lower side portion of the air preheating heat exchanger flows to the burner through the plurality of air supplying pipes connecting between the upper side portion of the air preheating heat exchanger and the burner. And, since the plurality of air supplying pipes are disposed in a radial layout along the circumference of the burner and provided inside the ceiling wall, it is possible to suppress cooling of the air which flows through the air supplying pipes with effective utilization of the ceiling wall as a heat insulator. Thus, air heated by the air preheating heat exchanger can be supplied appropriately to the burner, while suppressing drop in the temperature of the heat heated by the air preheating heat exchanger.

In short, according to the still further characterizing feature of the reforming furnace of the present invention, it is possible to further improve the heat insulating performance for suppressing escape of the heat generated by combustion of the burner to the outside of the furnace body and moreover to appropriately supply the air heated by the air preheating heat exchanger to the burner while suppressing drop in the temperature thereof.

DETAILED DESCRIPTION OF PREFERRED EMBODIMENTS

Embodiment

Next, an embodiment of the present invention will be explained with reference to the accompanying drawings.
(General Configuration of Reforming Device)

Figure 1:
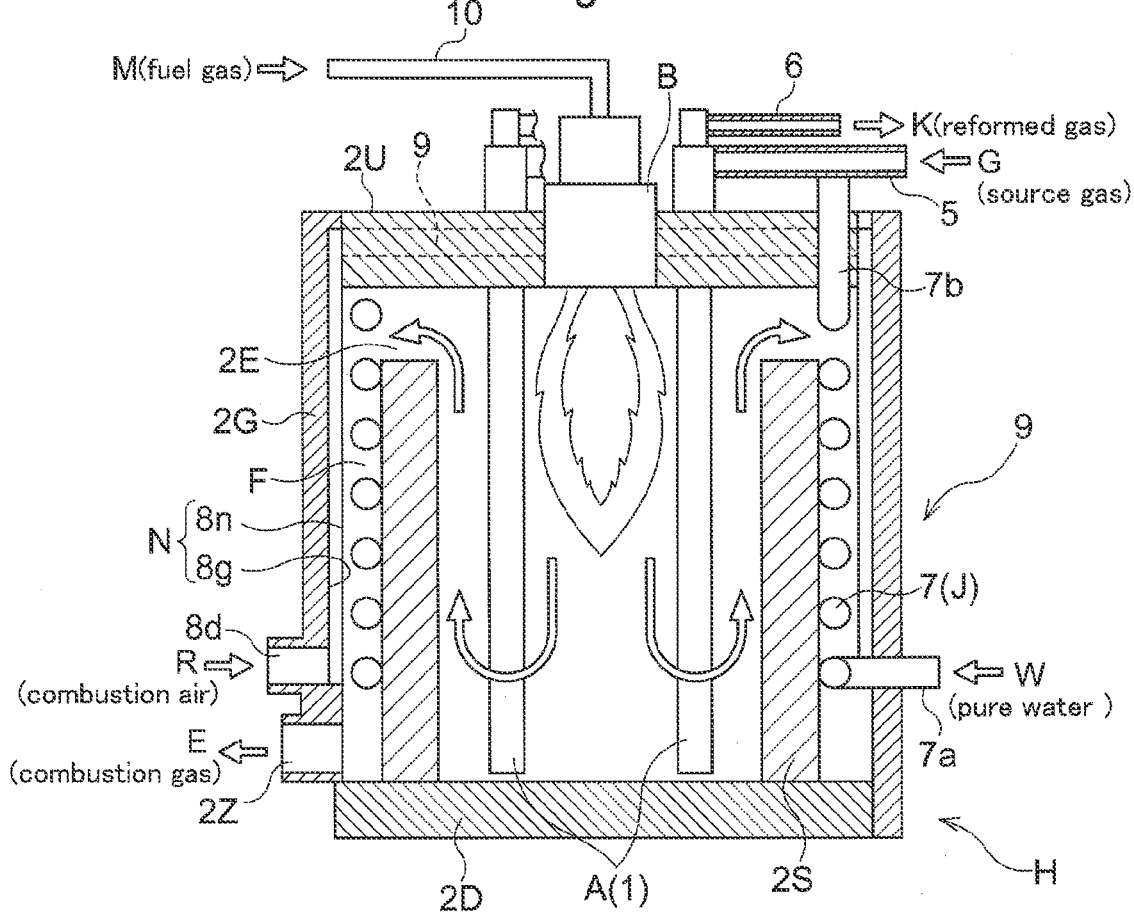
FIG. 1 is a front view in vertical section showing a reforming furnace.

As shown in FIG. 1, a reforming furnace is used for reforming a source gas G which can be a hydrocarbon-based gas such as a natural gas, naphtha, etc. into a reformed gas K having enriched hydrogen content through a steam reforming treatment thereof and the reforming furnace includes a furnace body H provided with a reforming reaction tube 1 and a burner B for heating this reforming reaction tube 1.

The furnace body H includes a ceiling wall 2U, a bottom wall 2D, and a cylindrical lateral wall 2S disposed between the ceiling wall 2U and the bottom wall 2D.

And, at a center portion of the ceiling wall 2U of the furnace body H, a burner B is provided to effect combustion downwards, and at an upper side portion of the lateral wall 2S, a discharging portion 2E is formed as an opening through which combustion gas of the burner B is to be discharged.

A plurality of reaction tube portions A together constituting the reforming reaction tube 1 are provided in the circumference of the burner B in suspension from the ceiling wall 2U of the furnace body H.

Figure 2:
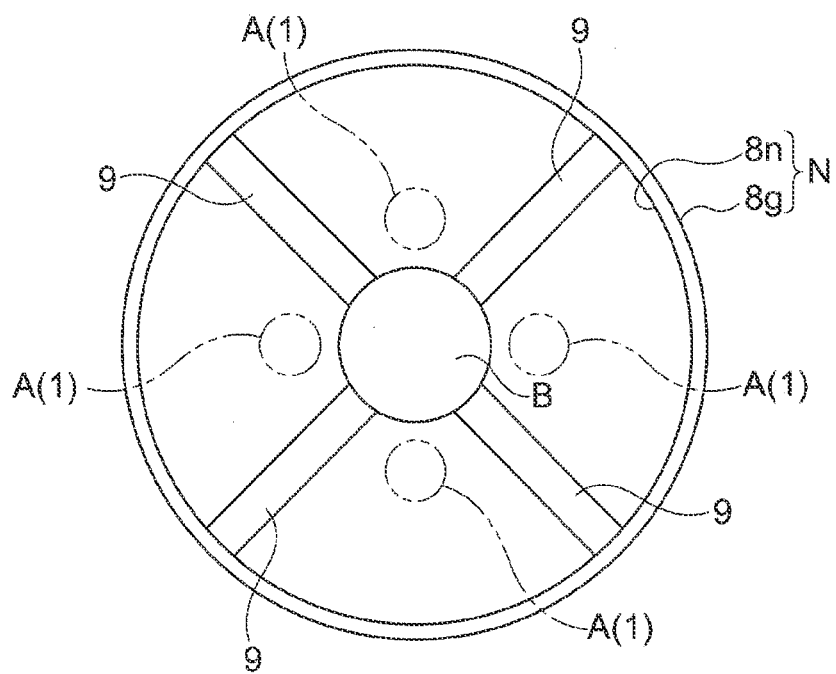
FIG. 2 is a plan view showing layout of air supplying pipes in the reforming furnace.

More particularly, as shown in FIG. 1 and FIG. 2, the reforming reaction tube 1 is configured with the plurality of reforming reaction tube portions A thereof suspended from the ceiling wall 2U of the furnace body H being arranged side by side with a spacing therebetween along the circumference of the burner B.

Incidentally, in the instant embodiment, there is disclosed an example in which four reaction tube portions A are provided as "the plurality of reaction tube portions A". However, it is also possible to embody with providing three or more or five or more reaction tube portions A.

Further, as shown in FIG. 1, an outer wall 2G having a cylindrical shape is provided at an outside portion of the lateral wall 2S of the furnace body H between the ceiling wall 2U and the bottom wall 2D.

And, in an outside space F formed between the lateral wall 2S and the outer wall 2G, there is disposed a steam generating heat exchanger J generating steam to be supplied to an upper portion of the reforming reaction tube. Further, at a lower side portion of the outer wall 2G, there is provided an outside discharging opening 2Z discharging the combustion gas which flows from the discharging portion 2E through the outside space F.

Moreover, as shown in FIG. 1, between the steam generating heat exchanger J and the outer wall 2G in the outside space F, there is provided an air preheating heat exchanger N for preliminarily heating air to be supplied to the burner B.
(Details of Reaction Tube Portions)

Figure 3:
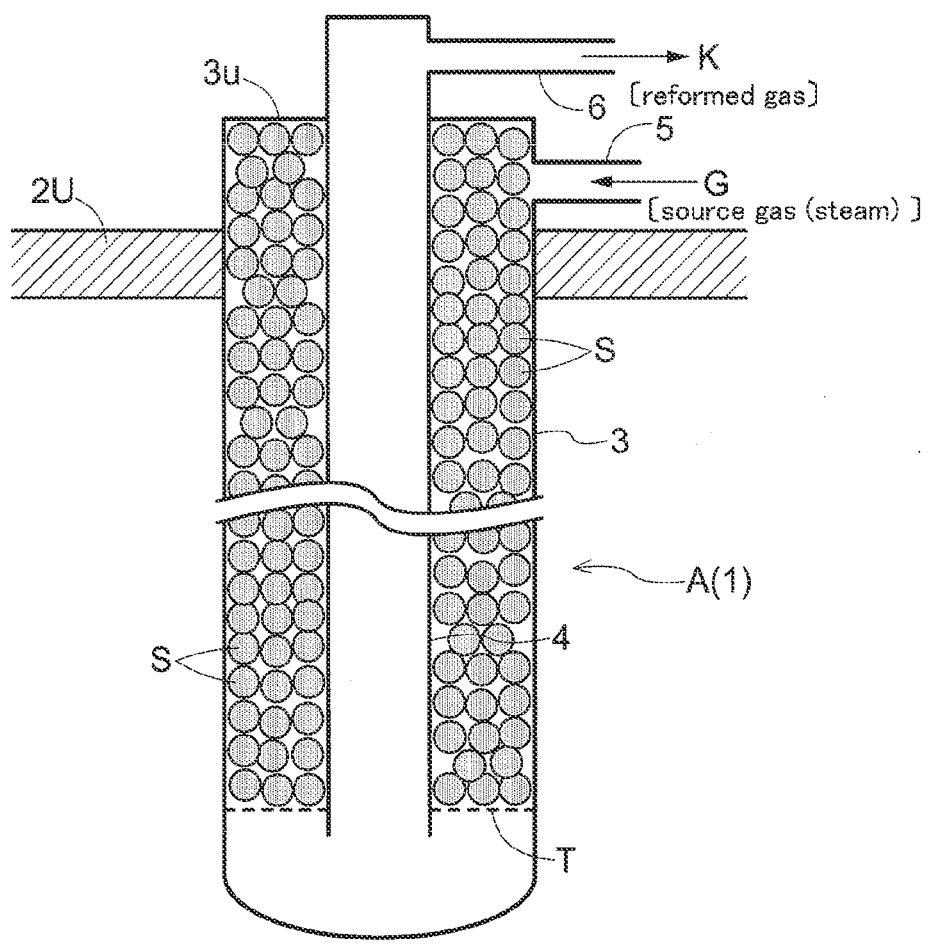
FIG. 3 is a partially omitted front view in vertical section showing a reaction tube.

Each reaction tube portion A, as shown in FIG. 3, includes an outer tube 3 having a closed bottom portion and an inner tube 4 disposed inside the outer tube 3. The inner tube 4 has its bottom portion opened and between the outer tube 3 and the inner tube 4, catalyst S in the form of grains is charged to form a charged portion.

An upper end side portion of the outer tube 3 is supported to the ceiling wall 2U by extending through this ceiling wall 2U of the furnace body H. An upper end side portion of the inner tube 4 is supported to a pipe upper wall $3u$ by extending through this pipe upper wall $3u$ of the outer tube 3.

Incidentally, between the outer tube 3 and the inner tube 4, a porous supporting body T receiving and supporting the catalyst S is provided as being supported to a lower end portion of the inner tube 4.

To a portion of the outer tube 3 protruding upwards from the ceiling wall 2U, there is connected a source gas pipe 5 for introducing source gas G, and to a portion of the inner tube 4 protruding from the pipe upper wall $3u$ of the outer tube 3, there is connected a reformed gas guiding pipe 6 for guiding the reformed gas K.

Incidentally, though not shown, the source gas pipe 5 is provided to branch to respective outer tubes 3 of the plurality of (four) reaction tube portions A.

Similarly, the reformed gas guiding pipe 6 is to be provided to branch to respective inner tubes 4 of the plurality of (four) reaction tube portions A.

Incidentally, to the source gas pipe 5, the steam generated by the steam generating heat exchanger J is to be supplied. And, through the source gas pipe 5, the source gas S and steam in a mixed state are supplied to the outer tubes 3.

In the reaction tube portion A, the outer tube 3 is heated to a high temperature (e.g. an average temperature of 800° C. approximately) as being heated to a target temperature for reforming reaction by the burner B and in association therewith, the catalyst S and the inner tube 4 are heated to a temperature lower than the outer tube 3 (e.g. an average temperature of 650° C. approximately)

And, as the source gas G mixed with steam introduced from the source gas pipe 5 flows downwards through the charged portion of the catalyst S between the outer tube 3 and the inner tube 4, the source gas G is reformed into the reformed gas K having enriched hydrogen content through a steam reforming treatment and after this reformed gas K passes upwards through the inside the inner tube 4, the gas is discharged through the reformed gas guiding pipe 6.

Incidentally, the reformed gas K discharged through the reformed gas guiding pipe 6, though explanation of details thereof omitted herein, will be conveyed to a CO reformer in which carbon monoxide contained in the reformed gas K is reformed into carbon dioxide by a CO reformer and then supplied to a pressure swing adsorption (PSA) device, whereby a final product gas having enriched hydrogen content will be produced.
(Details of Steam Generating Heat Exchanger)

The steam generating heat exchanger J, as shown in FIG. 1, is configured with a heat conducting pipe 7 arranged in a spiral form along the outer circumference of the lateral wall 2S of the furnace body H.

More particularly, at a lower end portion of the heat conducting pipe 7, there is formed a pure water introducing pipe portion 7a to which pure water W is supplied and at an upper end portion of the heat conducting pipe 7, there is formed a steam discharging pipe portion 7b for supplying steam to the source gas pipe 5.

Therefore, the steam generating heat exchanger J is configured to generate steam by causing the pure water W supplied to the pure water introducing portion 7a to flow through the inside of the heat conducting pipe 7 which is heated by the combustion gas flowing in the outside space F and the generated steam is supplied to the source gas pipe 5 via the steam discharging pipe portion 7b.

(Details of Air Preheating Heat Exchanger)

The air preheating heat exchanger N, as shown in FIG. 1 and FIG. 2, is configured in a cylindrical shape in which air is caused to flow through between a cylindrical inside wall 8n and a cylindrical outside wall 8g.

And, at a lower side portion of the air preheating heat exchanger N, an air introducing portion 8d is provided.

A plurality of air supplying pipes 9 connecting between the upper side portion of the air preheating heat exchanger N and the burner B are arranged radially along the circumference of the burner and provided inside the ceiling wall 2U of the furnace body H.

Therefore, the air preheating heat exchanger N is configured such that combustion air R supplied to the air introducing portion 8d is caused to flow through between the inside wall 8n and the outside wall 8g heated by the combustion gas flowing in the outside space F, thus being heated to a high temperature state and this air heated to such high temperature state through the air supplying pipes 9 is supplied to the burner B.

Incidentally, though details of the arrangement of the burner B are omitted herein, the burner B is connected not only to the air supplying pipes 9, but also to a fuel gas pipe 10 for supplying fuel gas M and configured such that the fuel gas M supplied via the fuel gas pipe 10 is combusted with the combustion air supplied via the air supplying pipes 9.

Other Embodiments

Next, other embodiments will be described respectively.

(1) In the foregoing embodiment, there was disclosed a case in which the reforming reaction pipe 1 is configured with a plurality of reaction pipe portions A thereof arranged side by side with a spacing therebetween along the circumference of the burner B. Alternatively, the reforming reaction tube 1 may be configured such that the catalyst S is charged to the inside of a double-tube tubular member covering the circumference of the burner B. And, the specific arrangement of the reforming reaction tube 1 may be modified in many ways appropriately.

(2) In the foregoing embodiment, there was disclosed a case in which the steam generating heat exchanger J generates steam with supply of pure water W thereto. However, it is also possible to embody the steam generating heat exchanger J such that this generates mixture gas of the source gas G and steam with supply of the source gas G and pure water W thereto.

(3) In the foregoing embodiment, there was disclosed a case in which in the steam generating heat exchanger J, the heat conducting pipe 7 is disposed in a spiral form along the outer circumference of the lateral wall 2S of the furnace body H. However, various modes of steam generating heat exchanger J are possible such as one configured as a fin-tube type heat exchanger.

Incidentally, the arrangements disclosed in the foregoing embodiment (including the modified embodiments) can be used in any combination with the arrangement(s) disclosed in the other embodiment(s), unless contradiction results from such combining. Further, it is understood that the embodiments disclosed in this detailed disclosure are only exemplary, and embodiments of the present invention are not limited thereto, but various modifications may be made appropriately within a range not deviating from the objects of the present invention.

DESCRIPTION OF SIGNS

1: reforming reaction tube
2D: bottom wall
2E: discharging portion
2G: outer wall
2S: lateral wall
2U: ceiling wall
2Z: outside discharging opening
3: outer tube
4: inner tube
7: heat conducting pipe
8d: air introducing portion
8n: inside wall
8g: outside wall
9: air supplying pipe
A: reaction tube portion
B: burner
J: steam generating heat exchanger
N: air preheating heat exchanger
S: catalyst

The invention claimed is:

1. A reforming furnace comprising:
a burner combusting downwards and provided at a center portion of a ceiling wall of a furnace body having a cylindrical lateral wall disposed between the ceiling wall and a bottom wall;
a reforming reaction tube provided in a circumference of the burner in suspension from the ceiling wall and configured to carry out a steam reforming treatment on a hydrocarbon-based gas as a source gas; and
a discharging portion provided as an opening at an upper side portion of the lateral wall for discharging combustion gas of the burner;
wherein a cylindrical outer wall is disposed at an outer side portion of the lateral wall between the ceiling wall and the bottom wall;
wherein, in an outside space formed between the lateral wall and the outer wall, there is disposed a steam generating heat exchanger generating steam or a mixture gas of a source gas and steam to be supplied to an upper portion of the reforming reaction tube;
wherein at a lower side portion of the outer wall, there is provided an outside discharging opening discharging the combustion gas which flows from the discharging portion through the outside space;
the reforming reaction tube comprises:
an outer tube having a closed bottom portion and a supported upper end side;
an inner tube disposed inside the outer tube, the inner tube having an opened bottom portion and a supported upper end side; and
a plurality of reaction tube portions charged with a catalyst and disposed between the outer tube and the inner tube, the reaction tube portions being disposed side by side with spacing therebetween along a circumference of the burner.

2. The reforming furnace of claim 1, wherein the steam generating heat exchanger is configured with a heat conducting pipe being disposed in a spiral form along an outer circumference of the lateral wall.

3. A reforming furnace, comprising:
   a burner combusting downwards and provided at a center portion of a ceiling wall of a furnace body having a cylindrical lateral wall disposed between the ceiling wall and a bottom wall;
   a reforming reaction tube provided in a circumference of the burner in suspension from the ceiling wall and configured to carry out a steam reforming treatment on a hydrocarbon-based gas as a source gas; and
   a discharging portion provided as an opening at an upper side portion of the lateral wall for discharging combustion gas of the burner;
   wherein a cylindrical outer wall is disposed at an outer side portion of the lateral wall between the ceiling wall and the bottom wall;
   wherein, in an outside space formed between the lateral wall and the outer wall, there is disposed a steam generating heat exchanger generating steam or a mixture gas of a source gas and steam to be supplied to an upper portion of the reforming reaction tube;
   wherein at a lower side portion of the outer wall, there is provided an outside discharging opening discharging the combustion gas which flows from the discharging portion through the outside space; and
   wherein between the steam generating heat exchanger and the outer wall in the outside space, there is provided an air preheating heat exchanger for preliminarily heating air to be supplied to the burner.

4. The reforming furnace of claim 3, wherein:
   the air preheating heat exchanger has a cylindrical configuration in which air is caused to flow between a cylindrical inside wall and a cylindrical outside wall;
   an air introducing portion is provided at a lower side portion of the air preheating heat exchanger; and
   a plurality of air supplying pipes connecting an upper side portion of the air preheating heat exchanger and the burner are disposed in a radial layout along the circumference of the burner and provided inside the ceiling wall.

5. The reforming furnace of claim 2, wherein between the steam generating heat exchanger and the outer wall in the outside space, there is provided an air preheating heat exchanger for preliminarily heating air to be supplied to the burner.

6. The reforming furnace of claim 1, wherein between the steam generating heat exchanger and the outer wall in the outside space, there is provided an air preheating heat exchanger for preliminarily heating air to be supplied to the burner.

* * * * *